Sept. 30, 1930.  F. W. BILLIG  1,777,273
HORN PROJECTOR
Filed March 4, 1927

WITNESS

INVENTOR
Fred W. Billig
BY
ATTORNEYS

Patented Sept. 30, 1930

1,777,273

UNITED STATES PATENT OFFICE

FRED W. BILLIG, OF JACKSON, MICHIGAN, ASSIGNOR TO THE SPARKS-WITHINGTON COMPANY, OF JACKSON, MICHIGAN, A CORPORATION OF OHIO

HORN PROJECTOR

Application filed March 4, 1927. Serial No. 172,654.

This invention relates to certain new and useful improvements in horn projectors.

In the use of horns or signaling devices upon automobiles or other moving vehicles, it is found quite essential to cover the open end of the sound projector with a screen structure to prevent the entrance of undesirable material into the projector and such screens have usually been held in place by a clamping ring or by a screw and nut, and the main object of this invention is to provide a more economic construction of projector and screen which eliminates the necessity of utilizing additional parts to secure the screen in place, and does not deface the outward appearance of the projector.

Other objects and advantages relate to the details of the structure and the form and relation of the parts thereof, all as will more fully appear from the following description taken in connection with the accompanying drawings, in which:—

Figure 1:
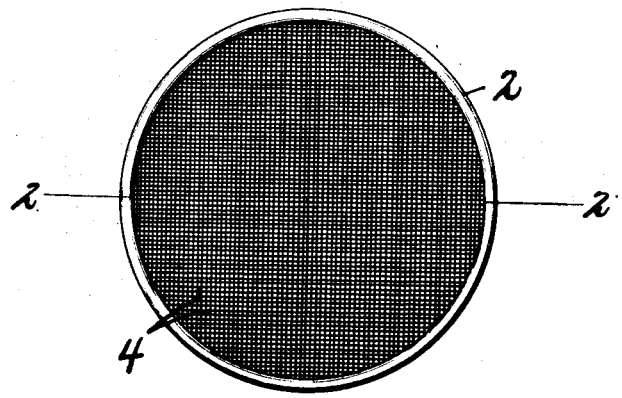
Figure 1 is a front elevation of a portion of of a horn projector.
Figure 2:
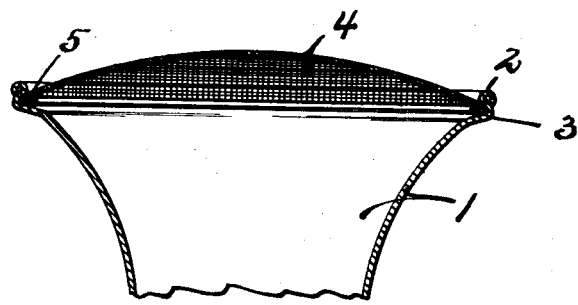
Figure 2 is a section on line 2—2, Figure 1.

As illustrated in the drawings, the projector —1— may be drawn from sheet metal and is of tubular flaring form. At its outer end the projector is provided with a bead —2— formed by rolling the metal outwardly and at the base of the bead the projector is formed with an annular groove —3—, the walls of which as shown underlie the bead —2—. A screen —4— is provided of substantially the same shape as the cross-sectional shape of the projector, but of somewhat larger area and where, as in this case, the open end of the projector is circular in form, the diameter of the screen is somewhat greater than the diameter of the open end of the projector, and also the screen is of somewhat greater diameter than the diameter of the annular groove —3—.

The edge of the screen is preferably folded back upon itself so as to form a reinforced or strengthened edge, and this reinforced edge is then pressed or forced into the annular groove —3—, and in view of the fact that the screen is of greater diameter than the groove, the screen bows outwardly at its central portion and the normal tension of the screen when bowed maintains the reinforced edge —5— tightly in position in the annular groove —3— in the wall of the projector —1— at a point adjacent and underlying the bead —2—.

In this manner an economic assemblage is produced and the screen is held in place by its own tension and without the necessity of providing additional parts for securing the screen to the projector.

Altho I have shown and described a specific construction, form and relation of the parts thereof as illustrative of an embodiment of the invention, I do not desire to restrict myself to the details of the same, as various changes and modifications may be made within the scope of the appended claims.

I claim:

1. A horn projector comprising a tubular shell having its open end formed with a bead with an annular groove underlying the bead, and a semi-spherical screen having its edge confined in the groove and its central portion extending outwardly beyond the end of the tubular shell.

2. A horn projector comprising a tubular shell having its open end formed with a bead with an annular groove underlying the bead, and a screen of greater diameter than the diameter of the groove and having its edge positioned in the groove and its central portion bowed outwardly beyond the end of the tubular shell.

In witness whereof I have hereunto set my hand this 15th day of February, 1927.

FRED W. BILLIG.